(12) United States Patent
Tollefsrud et al.

(10) Patent No.: US 10,405,534 B2
(45) Date of Patent: Sep. 10, 2019

(54) SYSTEM AND METHOD FOR ELECTRONIC FLUID MEASUREMENT

(71) Applicant: CNH Industrial America LLC, New Holland, PA (US)

(72) Inventors: Aaron Tollefsrud, Willmar, MN (US); Bruce Bastin, Sask, MN (US)

(73) Assignee: CNH Industrial America LLC, New Holland, PA (US)

( * ) Notice: Subject to any disclaimer, the term of this patent is extended or adjusted under 35 U.S.C. 154(b) by 696 days.

(21) Appl. No.: 14/558,011

(22) Filed: Dec. 2, 2014

(65) Prior Publication Data

US 2016/0150771 A1 Jun. 2, 2016

(51) Int. Cl.
   *B67D 7/56* (2010.01)
   *A01M 7/00* (2006.01)
   (Continued)

(52) U.S. Cl.
   CPC ........ *A01M 7/0089* (2013.01); *A01M 7/0085* (2013.01); *B60K 15/00* (2013.01);
   (Continued)

(58) Field of Classification Search
   CPC ... A01M 7/0089; A01M 7/0085; B60K 35/00; B60K 37/00; F01M 11/06; F16N 19/003;
   (Continued)

(56) References Cited

U.S. PATENT DOCUMENTS 4,231,261 A * 11/1980 Elmer ................... G01L 7/18
                                                        73/716
4,770,038 A    9/1988 Zuckerwar et al.
                    (Continued)

FOREIGN PATENT DOCUMENTS

DE   102010034173 A1   2/2012
EP      0145379 A2     6/1985
                    (Continued)

OTHER PUBLICATIONS

Astsensors; Liquid Level Measurement Overview, American Sensors Technologies; Accessed Jun. 21, 2013; Webpage; http://www.astsensors.com/application/pressure/level-sensor-application.php.
(Continued)

*Primary Examiner* — Steven J Ganey
(74) *Attorney, Agent, or Firm* — Rebecca L. Henkel; Richard K. DeMille

(57) ABSTRACT

An agricultural product application implement includes a system and method for indicating an amount of fluid stored. A pressure transducer installed at the sump of a fluid tank may electronically measure and display a fluid depth. Instrumentation, such as the instrument cluster unit for the implement, can be programmed via software to convert the voltage output of the pressure transducer to a volume measurement to be displayed in the operator's line of sight. Software may be provided within an instrument cluster unit for self-calibrating to account for varying densities of different chemical solutions. The pressure transducer may be used in conjunction with a transfer medium to prevent corrosive chemical solutions from contacting the pressure transducer.

8 Claims, 4 Drawing Sheets

(51) Int. Cl.

| | |
|---|---|
| *B60K 35/00* | (2006.01) |
| *B60K 37/00* | (2006.01) |
| *F01M 11/06* | (2006.01) |
| *G01F 25/00* | (2006.01) |
| *G01F 23/18* | (2006.01) |
| *G07C 5/00* | (2006.01) |
| *F16N 19/00* | (2006.01) |
| *B60K 15/00* | (2006.01) |
| *B60K 15/03* | (2006.01) |

(52) U.S. Cl.
CPC .............. *B60K 35/00* (2013.01); *B60K 37/00* (2013.01); *F01M 11/06* (2013.01); *F16N 19/003* (2013.01); *G01F 23/18* (2013.01); *G01F 25/0061* (2013.01); *G07C 5/00* (2013.01); *B60K 2015/03217* (2013.01)

(58) Field of Classification Search
CPC ....... G01F 23/18; G01F 25/0061; G07C 5/00; B65B 3/30; B65B 1/30; B65B 1/48; F17C 2250/043; F17C 13/025; F17C 2223/035; F17C 2223/036; F17C 2223/033
USPC .................... 239/74, 159–169; 141/83, 95
See application file for complete search history.

(56) References Cited

U.S. PATENT DOCUMENTS

| | | | | |
|---|---|---|---|---|
| 4,803,626 | A * | 2/1989 | Bachman | A01M 7/0089 |
| | | | | 118/323 |
| 4,840,056 | A | 6/1989 | Fernandez et al. | |
| 5,211,678 | A | 5/1993 | Stephenson et al. | |
| 5,307,683 | A * | 5/1994 | Phelps | G01L 9/085 |
| | | | | 702/86 |
| 5,351,725 | A * | 10/1994 | Suthergreen | G01F 1/007 |
| | | | | 141/1 |
| 5,791,187 | A | 8/1998 | Chang | |
| 5,811,690 | A * | 9/1998 | Hershey | G01P 1/006 |
| | | | | 73/299 |
| 6,542,848 | B1 | 4/2003 | Neeser et al. | |
| 7,114,384 | B1 | 10/2006 | Bates et al. | |
| 7,669,473 | B2 | 3/2010 | Hedrick | |
| 8,220,502 | B1 | 7/2012 | Kelekar et al. | |
| 8,297,119 | B2 | 10/2012 | Parkinson | |
| 8,336,385 | B1 * | 12/2012 | Bergum | G01L 19/0645 |
| | | | | 73/706 |
| 2003/0070487 | A1 * | 4/2003 | DaCosta | C01B 3/0005 |
| | | | | 73/708 |
| 2005/0000277 | A1 * | 1/2005 | Giles | A01C 23/047 |
| | | | | 73/114.48 |
| 2009/0241817 | A1 * | 10/2009 | Eastin | A01C 1/06 |
| | | | | 111/118 |
| 2009/0272188 | A1 * | 11/2009 | Byrne | G01F 23/18 |
| | | | | 73/309 |
| 2010/0098130 | A1 * | 4/2010 | Kanie | G01K 1/26 |
| | | | | 374/1 |
| 2010/0286932 | A1 | 11/2010 | Caldwell et al. | |
| 2013/0000741 | A1 | 1/2013 | Crary | |
| 2016/0178422 | A1 * | 6/2016 | Humpal | A01M 7/0042 |
| | | | | 239/71 |

FOREIGN PATENT DOCUMENTS

| | | |
|---|---|---|
| KR | 101000077 81 | 12/2010 |
| WO | 1993006438 A1 | 4/1993 |
| WO | 2012066482 A1 | 5/2012 |

OTHER PUBLICATIONS

TankVision; TankVision; Fire Research Corporation; Accessed Jun. 21, 2013; Webpage; http://www.fireresearch.com/product.php?id=wla200.

Water Tank depth Sensor; Accessed Jun. 26, 2013; from the internet at: http://www.practicalarduino.com/projects/water-tank-depth-sensor.

Maretron; FPM Fluid Pressure Monitor; waybackmachine archive of website; Feb. 2013; https://web.archive.org/web/20130227052601/http://www.maretron.com/products/fpm100.php.

* cited by examiner

SYSTEM AND METHOD FOR ELECTRONIC FLUID MEASUREMENT

FIELD OF THE INVENTION

The invention relates generally to machines having tanks for fluid storage, and in particular, to self-propelled sprayer applicator machines having chemical storage tanks.

BACKGROUND OF THE INVENTION

Current methods for indicating remaining volume of a chemical solution in, for example, a self-propelled chemical applicator typically consists of a clear hose plumbed to fittings at the top and bottom of a tank along with a decal calibrated by the manufacturer. Fluid volume is visually checked by looking at the top of the fluid in the clear hose and transposing the plane of that level onto the decal which displays volume.

However, due to the colorless nature of many fluids, including water, the transparency of the fluid may be nearly identical to the transparency of the clear hose thereby making the top of the fluid column difficult to view. Certain improvements have added buoyant objects inside the tube to aid in quickly noting fluid volume. However, chemical reactions between the fluid and the clear hose, which may typically be made from a petroleum based product, may cause the hose to become discolored over time, thereby once again making viewing difficult. Other improvements have relied on electronic depth measurement using fuel sensors. However, taller tanks, requiring taller sensors, create high bending loads on the sensor electronics (usually contained at the mounting point), such as when the dynamics of the fluid causes sloshing. These high bending loads can result in fatigue of the circuit board connections and consequently yield an unreliable sensor.

In addition, because chemical solution tanks are typically located behind an operator's station/cab, checking the remaining volume of the fluid typically requires the operator to stray 180° from the machines forward direction. This may be ergonomically inefficient for the operator and could potentially contribute to an unsafe operating condition.

A need therefore exists to provide a reliable, cost effective ability for indicating remaining volume of a fluid that eliminates one or more of the foregoing disadvantages.

SUMMARY OF THE INVENTION

The present invention is directed to a system and method for indicating an amount of fluid stored in an agricultural product application implement. A pressure transducer installed at the sump of a fluid tank may electronically measure and display a fluid depth. Instrumentation, such as the instrument cluster unit ("ICU") for the implement, can be programmed via software to convert the voltage output of the pressure transducer to a volume measurement to be displayed in the operator's line of sight. To account for varying densities of different chemical solutions, software may be written within the ICU to self-calibrate the product density. The pressure transducer may also be used in conjunction with a transfer medium, such as glycerin, to prevent corrosive chemical solutions from contacting the pressure transducer.

Accordingly, issues with clear tube discoloration are avoided. Also, because the fluid being measured is not in contact with the sensor, reliability of the sensor due to fluid dynamics is not affected. In addition, accuracy of the system may be set according to accuracy of the pressure transducer.

Embodiments according to the present invention may be adaptable to a wide variety of machines, storage tanks and fluids. Fluids may include, for example, chemical solutions (such as agricultural chemical solutions), water, fuel, oil, coolant, and so forth.

According to one aspect of the invention, a system for indicating an amount of fluid stored in a self-propelled agricultural product application implement may comprise: a tank with an interior volume for holding fluid; a pressure transducer disposed on a base of the interior volume of the tank for sensing an amount of pressure within the tank expected by a fluid held within the tank and generating a first electrical signal corresponding to the amount of pressure; a controller operable to receive the first electrical signal to determine an amount of fluid within the tank based on the amount of pressure and the interior volume, and to generate a second electrical signal corresponding to the amount of fluid; and a display operable to receive the second electrical signal and to display the amount of fluid held within the tank to an operator of the implement while the operator is in a forward facing position.

According to another aspect of the invention, a transfer medium, such as glycerin, may be disposed above the pressure transducer for protecting the pressure transducer from the fluid.

According to another aspect of the invention, the controller may be operable to self-calibrate for differing types of fluid having differing densities. Also, a selection source may provide an input to the controller for selecting a type of fluid held within the tank.

According to another aspect of the invention, a temperature sensor disposed in the interior volume of the tank, wherein the controller further determines the amount of fluid based on a temperature sensed from within the tank. Also, a transfer medium may be disposed above the temperature sensor for protecting the temperature sensor from the fluid.

According to another aspect of the invention, a method for indicating an amount of fluid stored in a self-propelled agricultural product application implement may comprise: holding a fluid within a tank having an interior volume; sensing an amount of pressure within the tank resulting from the fluid using a pressure transducer disposed on a base of the interior volume of the tank and communicating a first electrical signal corresponding to the amount of pressure; determining an amount of fluid within the tank based on the amount of pressure communicated by the first electrical signal and the interior volume, and communicating a second electrical signal corresponding to the amount of fluid; and displaying the amount of fluid within the tank as communicated by the second electrical signal to a display visible by an operator of the implement while the operator is in a forward facing position.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
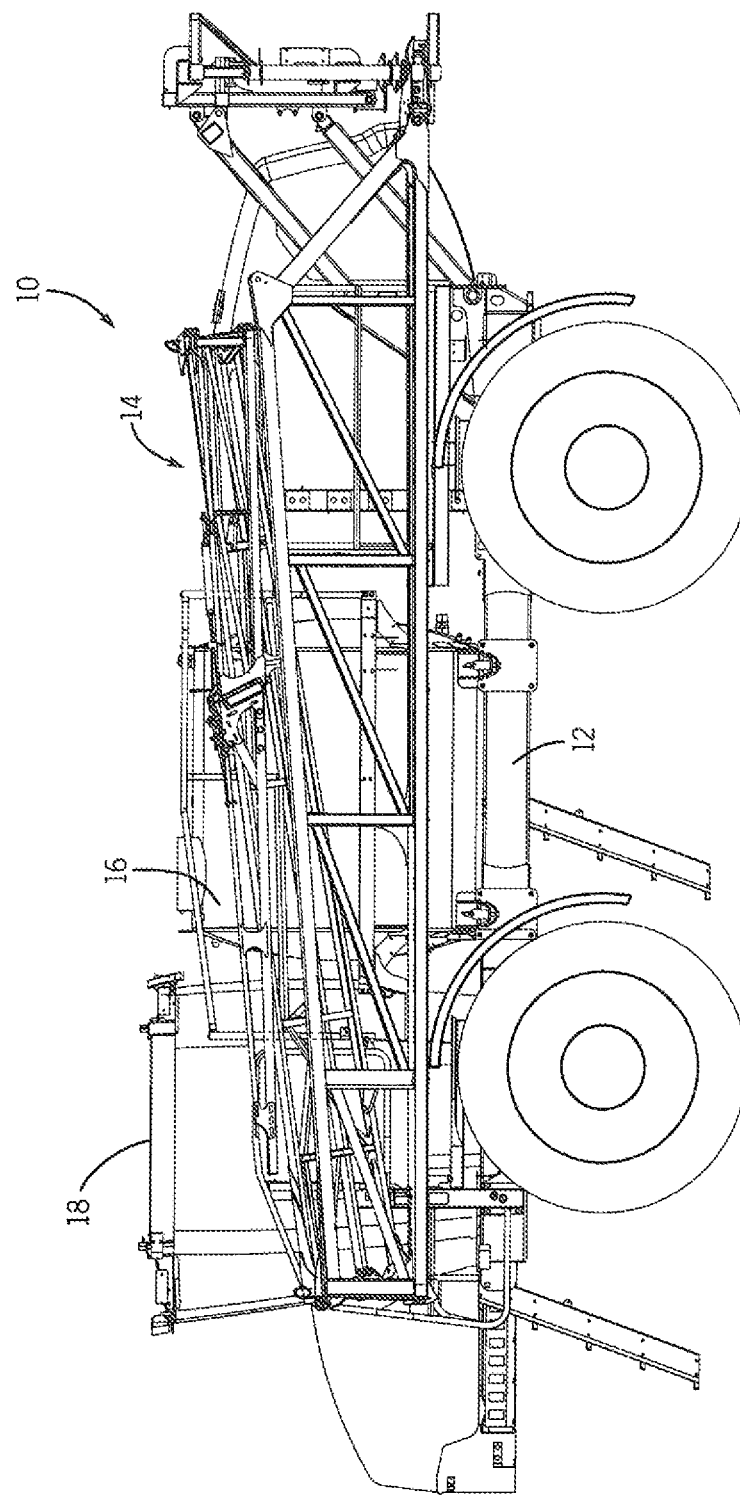
FIG. 1 is a simplified cross-sectional view of a self-propelled agricultural product application implement in accordance with an embodiment of the present invention.

Referring now to the drawings and specifically to FIG. 1, aspects of the present invention will now be described by way of an exemplar environment of a self-propelled agricultural product application implement 10, which may be an agricultural sprayer, in accordance with an embodiment of the present invention. While an agricultural product application implement is shown and described, it is understood that the present invention is not limited to such an implement and thus may be applicable with other types of machines including, but not limited to construction machines.

The implement 10 may include a frame 12 to which a pair of wing booms 14 may be connected. The wing booms 14 may support a series of spraying units designed to deliver fluid from a tank 16 centrally supported on a frame 12, onto a farming or planting surface. The tank 16 may be positioned generally in the center of the frame 12 between the wing booms 14 and an operator cab 18. The tank 16 may be designed to contain fluid, such as herbicide, insecticide, fertilizer, or other agricultural chemical solutions, which may be fed to the spraying units through a series of fluid lines as known in the art. As also known in the art, the operator cab 18 contains an instrument cluster unit ("ICU") or control panel that has various operator controls for monitoring and controlling operation of the sprayer and its components.

Figure 2:
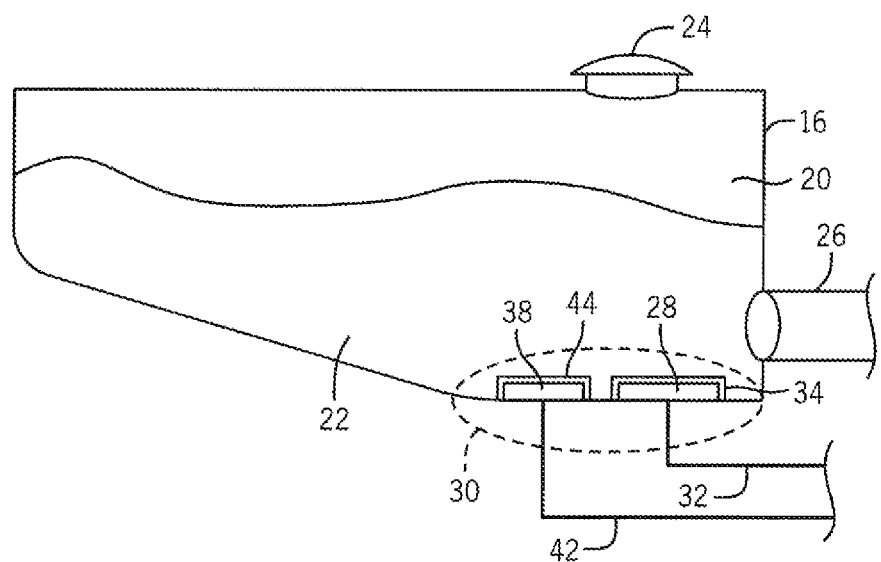
FIG. 2 is a simplified cross-sectional view of a tank with an interior volume for holding fluid in the implement of FIG. 1.

Referring now to FIG. 2, a simplified cross-sectional view of the tank 16 having an interior volume 20 for holding fluid 22 is provided in accordance with an embodiment of the present invention. The fluid 22 may be an agricultural chemical solution, however, in other embodiments, the fluid 22 could be water, fuel, oil, coolant, or any other fluid in which displaying a measured volume is desirable. The tank 16 also includes an entry port 24 in which the fluid 22 may enter to fill the tank 16 and an exit port 26 in which the fluid 22 may be drawn from the tank 16 to one or more fluid lines for use.

A pressure transducer 28 is disposed on a base 30 of the interior volume 20 of the tank 16. The base 30 may be the sump of the tank 16, representing a lower area of the tank 16 relative to ground and the force of gravity. In operation, the pressure transducer 28 senses an amount of pressure within the tank resulting from the fluid 22 held within the tank 16 above the pressure transducer 28. The pressure transducer 28 then generates an electrical pressure signal 32 corresponding to the amount of pressure. The pressure transducer 28 may be manufactured using a piezoelectric material, such as quartz, or piezoresistive transducer mounted on a corrosive resistant diaphragm, such as stainless steel. In addition, a transfer medium 34, such as glycerin, may be disposed above the pressure transducer 28 to protect the pressure transducer 28 from the fluid 22, such as to prevent corrosion.

A temperature sensor 38 may also be disposed in the interior volume 20 of the tank 16, which may preferably be in proximity to the pressure transducer 28. In operation, the temperature sensor 38 may sense a temperature within the tank and may generate an electrical temperature signal 42 corresponding to the temperature. The temperature sensor 38 may be a thermocouple, thermistor, or other temperature sensing device as known in the art. In addition, a transfer medium 44, such as glycerin, may also be disposed above the temperature sensor 38 to protect the temperature sensor 38 from the fluid 22, such as to prevent corrosion.

Figure 3:
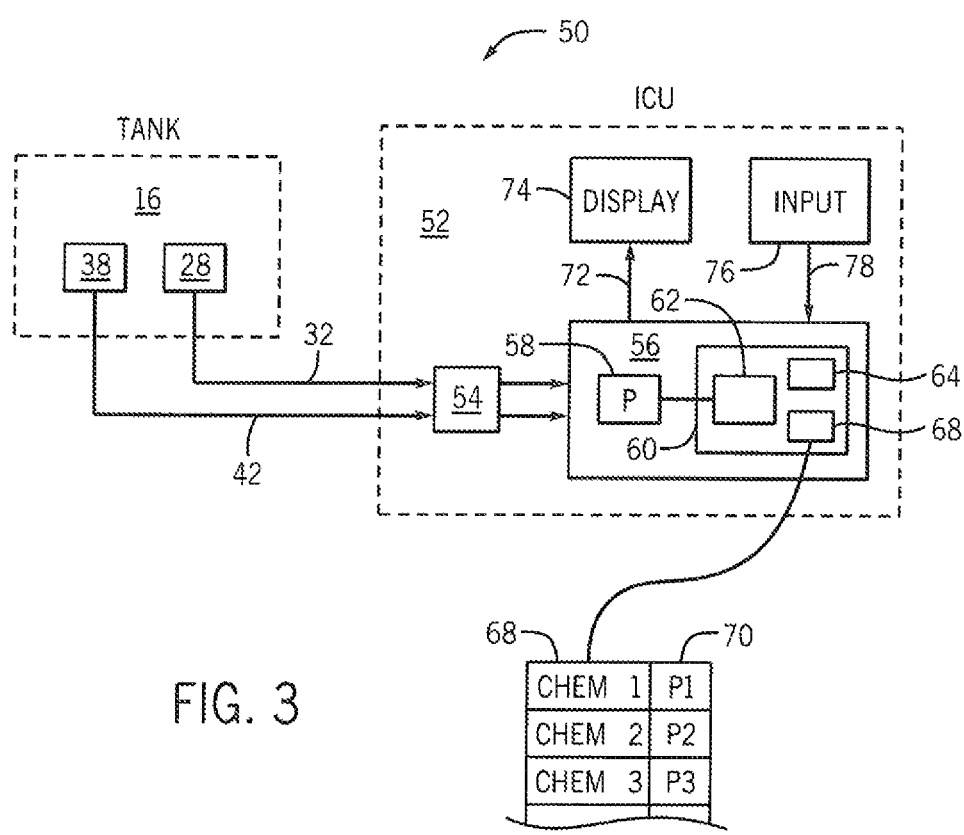
FIG. 3 is a schematic representation of a system for indicating an amount of fluid in the implement of FIG. 1.

Referring now to FIG. 3, a schematic representation of a system 50 for indicating an amount of fluid in the implement 10 is provided in accordance with an embodiment of the present invention. In the system 50, the electrical pressure signal 32 and the electrical temperature signal 42 may be provided to an instrument cluster unit (ICU) 52, which may be located in the operator cab 18. The electrical pressure signal 32 and the electrical temperature signal 42 may (optionally) be received by circuitry 54, providing signal conditioning and/or buffering, and is ultimately received by a controller 56. The controller 56 includes a processing element 58 and a data storage element 60. The data storage element 60, which may be, for example, a rewritable non-volatile flash memory or other non-transient medium, includes a software module 62, a system data structure 64 and a library data structure 66. The system data structure 64 includes programming data values for the system, including the dimensions and interior volume of the tank 16. The library data structure 66 essentially provides a table providing types of fluids 68 linked to corresponding densities ("ρ") 70. The software module 62, the system data structure 64 and the library data structure 66 may be programmed and configured during manufacturing and may be updated from time to time in the field.

In operation, the controller 56 may be operable to receive the electrical pressure signal 32 and execute the software module 62 to determine an amount of fluid within the tank 16 based on the amount of pressure indicated by the electrical pressure signal 32, the type of fluid, such as with reference to the library data structure 66 and a selected density, and/or the interior volume, such as with reference to the system data structure 64 and the programming data values. The controller 56 may also receive the electrical temperature signal 42 and execute the software module 62 to determine the amount of fluid within the tank 16 using a more precise temperature measurement. The software module 62 may apply, for example, one or more of Boyle's law, Gay-Lussac's law, Avogadro's law, the combined gas law, ideal gas law and/or other similar laws and principles as known in the art. Accordingly, the controller is operable to generate a measurement signal 72 corresponding to the amount of fluid.

A display 74 of the ICU 52 is operable to receive the measurement signal 72 and display the amount of fluid held within the tank 16. The display 74 is preferably positioned such that the operator of the implement 10 may view the display 74 while the operator is in a forward facing position. As a result, the need for an operator to stray 180° from the machines forward direction of travel is eliminated thereby increasing safety. In addition, a more ergonomically efficient arrangement for the operator is provided.

In an embodiment, the software module 62 may default to a particular type of fluid and corresponding density. In an alternative embodiment, an input module 76 may operate to provide a selection signal 78 to the controller 56 for selecting, or otherwise providing data for, a particular type of fluid and corresponding density. The input module 76 could essentially be a selection source controllable by the operator via the ICU 52.

Figure 4:
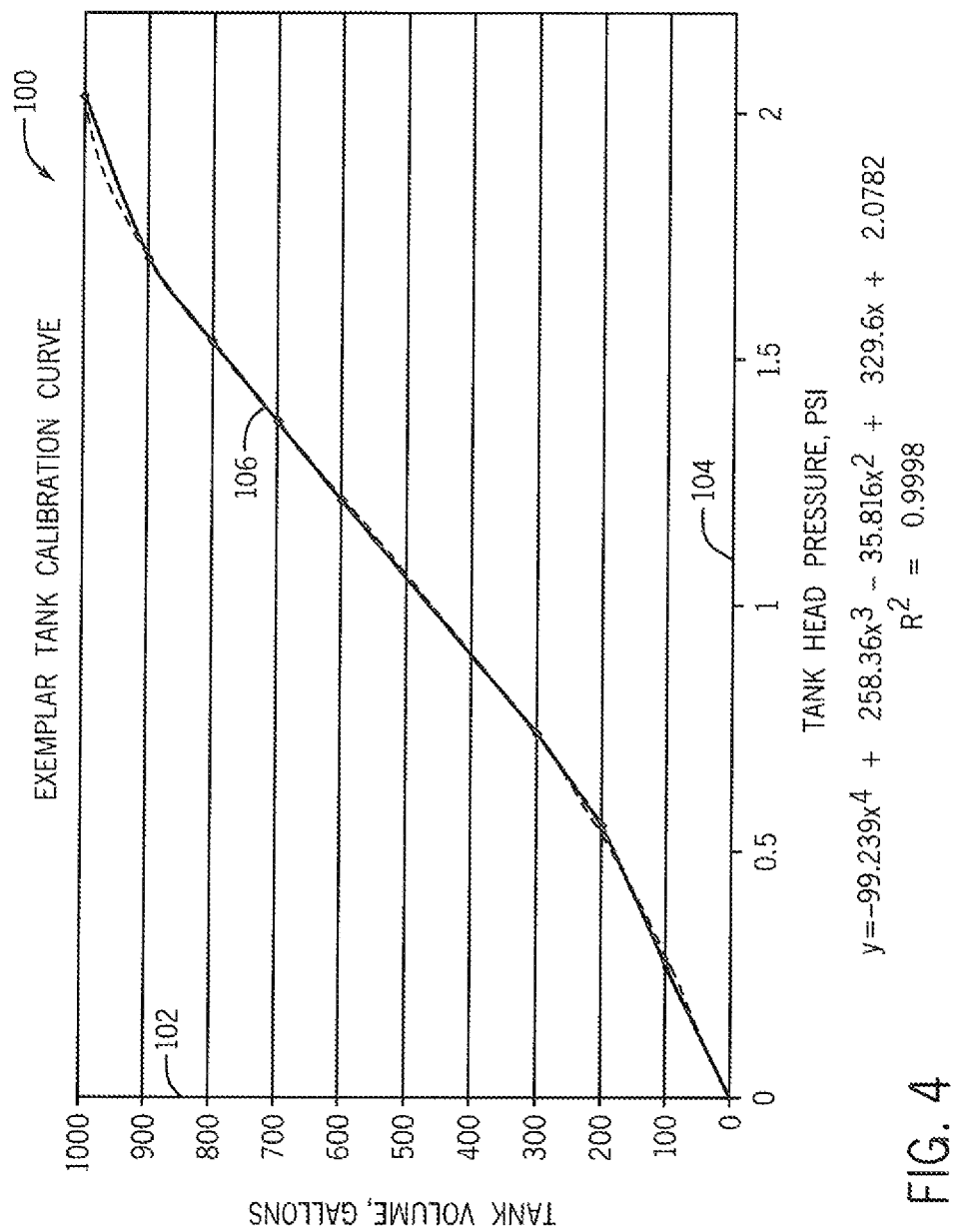
FIG. 4 is an exemplar calibration curve determining an amount of fluid within the tank in accordance with an embodiment of the present invention.

Referring now to FIG. 4, an exemplar calibration curve 100 for determining an amount of fluid within the tank is provided in accordance with an embodiment of the present invention. The calibration curve 100 may be determined by the controller 56 executing the software module 62 with reference to the system data structure 64 and the library data structure 66. The calibration curve 100 may provide, for example, on a first ("x") axis 102 a tank head pressure, measurable in inches of water (or millibar), and on a second ("y") axis 104, a tank volume, measurable in gallons (or liters). An equation may be expressed plotting 106 tank volumes as a function of pressure for a particular type of fluid. Accordingly, the controller 56, upon receiving sensed values from the tank, such as the pressure and temperature from within the tank, may accurately determine a corresponding volume of the tank for display.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The present invention may be part of a "safety system" used to protect human life and limb in a field, construction or other environment. Nevertheless, the term "safety," "safely" or "safe" as used herein is not a representation that the present invention will make the environment safe or that other systems will produce unsafe operation. Safety in such systems depends on a wide variety of factors outside of the scope of the present invention including: design of the safety system, installation and maintenance of the components of the safety system, and the cooperation and training of individuals using the safety system. Although the present invention is intended to be highly reliable, all physical systems are susceptible to failure and provision must be made for such failure.

Many changes and modifications could be made to the invention without departing from the spirit thereof. The scope of these changes will become apparent from the appended claims.

We claim:

1. A system for indicating an amount of fluid stored in a self-propelled agricultural product application implement comprising:
   a tank with an interior volume for holding fluid;
   a pressure transducer disposed on a base of the interior volume of the tank for sensing an amount of pressure within the tank resulting from the fluid held within the tank above the pressure transducer and generating a first electrical signal corresponding to the amount of pressure;
   a controller operable to receive the first electrical signal to determine an amount of fluid within the tank based on the amount of pressure and the interior volume, and to generate a second electrical signal corresponding to the amount of fluid;
   a display operable to receive the second electrical signal and to display the amount of fluid held within the tank to an operator of the implement while the operator is in a forward facing position; and
   a transfer medium disposed above the pressure transducer, the transfer medium comprising a liquid for protecting the pressure transducer from the fluid
   wherein the base represents a lower area of the tank relative to a surface on which the self-propelled agricultural product application implement is supported and to a force of gravity.

2. The system of claim 1, wherein the liquid of the transfer medium is glycerin.

3. The system of claim 1, further comprising the controller operable to calibrate for different types of fluids having differing densities based on a calibration curve.

4. The system of claim 3, further comprising a selection source providing an input to the controller for selecting a type of fluid held within the tank.

5. The system of claim 1, wherein the controller and the display are provided as part of an instrument cluster unit (ICU) for the implement.

6. The system of claim 1, further comprising a temperature sensor disposed in the interior volume of the tank, wherein the controller further determines the amount of fluid based on a temperature sensed from within the tank.

7. A system for indicating an amount of fluid stored in a self-propelled agricultural product application implement comprising:
   a tank with an interior volume for holding fluid;
   a pressure transducer disposed on a base of the interior volume of the tank for sensing an amount of pressure within the tank resulting from the fluid held within the tank above the pressure sensor and generating a first electrical signal corresponding to the amount of pressure, the base of the interior volume of the tank representing a lower area of the tank relative to a surface on which the self-propelled agricultural product application implement is supported and to a force of gravity;
   a controller operable to receive the first electrical signal to determine an amount of fluid within the tank based on the amount of pressure and the interior volume, and to generate a second electrical signal corresponding to the amount of fluid;
   a display operable to receive the second electrical signal and to display the amount of fluid held within the tank to an operator of the implement while the operator is in a forward facing position; and
   a transfer medium disposed above the pressure transducer, the transfer medium comprising a liquid for protecting the pressure transducer from the fluid;

wherein the pressure transducer includes a piezoresistive material mounted on a corrosive resistant diaphragm.

8. The system of claim 7, wherein the implement is a sprayer applicator and the fluid is an agricultural chemical solution.

* * * * *